United States Patent [19]

Myers et al.

[11] Patent Number: 4,657,715

[45] Date of Patent: Apr. 14, 1987

[54] PROCESS FOR PREPARING SMOOTH SKINNED EXTRUDED FOAMS WITH WATER-ORGANIC BLOWING AGENT

[75] Inventors: Donald W. Myers, Canandaigua; Dennis O'Brien, Rochester, both of N.Y.

[73] Assignee: Mobil Oil Corporation, New York, N.Y.

[21] Appl. No.: 687,680

[22] Filed: Dec. 31, 1984

[51] Int. Cl.$^4$ .................... C08J 9/14; C08J 9/34; B29C 47/20
[52] U.S. Cl. ............................ 264/45.5; 264/45.9; 264/53; 264/DIG. 5; 425/461; 425/817 C
[58] Field of Search ................ 264/45.5, 45.9, 53, 264/54, DIG. 5; 425/461, 817 C

[56] References Cited

U.S. PATENT DOCUMENTS

| | | | |
|---|---|---|---|
| 3,845,184 | 10/1974 | Nackaerts | 264/54 |
| 3,963,403 | 6/1976 | Hughes et al. | 264/45.9 X |
| 4,049,768 | 9/1977 | Luthra | 264/45.5 |
| 4,424,287 | 1/1984 | Johnson et al. | 264/53 X |
| 4,455,272 | 6/1984 | Schubert et al. | 264/53 |

Primary Examiner—Philip Anderson
Attorney, Agent, or Firm—Alexander J. McKillop; Michael G. Gilman; Edward J. Trojnar

[57] ABSTRACT

Water instead of carbon dioxide is substituted for part of the volatile organic blowing agent, e.g., pentane, resulting in extruded foams having a smooth, lustrous drum side skin compared to foams containing only organic blowing agent or organic blowing agent plus carbon dioxide.

9 Claims, 6 Drawing Figures

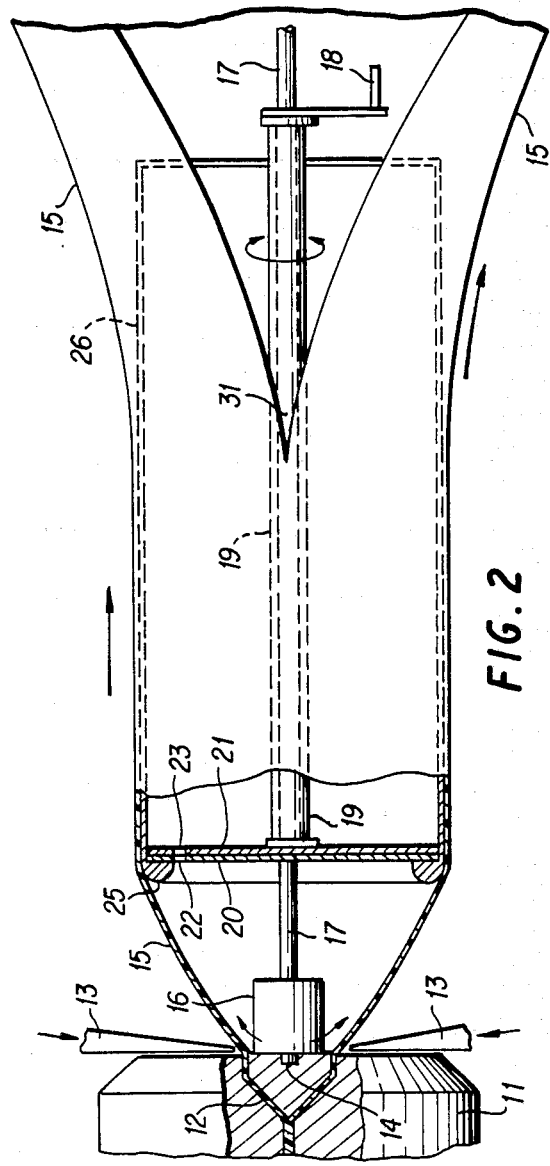
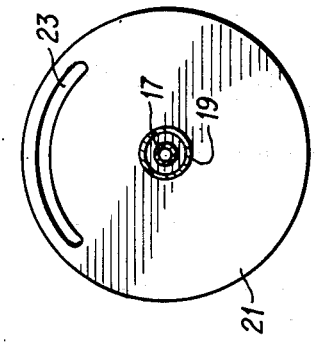
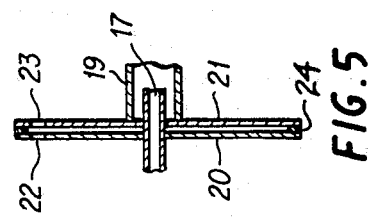
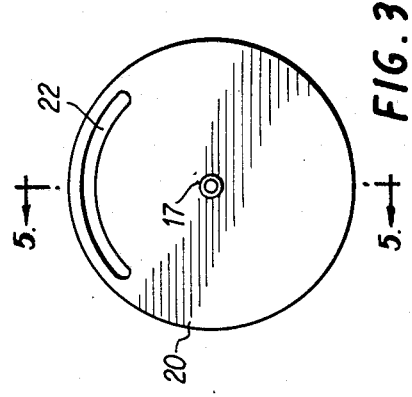

PROCESS FOR PREPARING SMOOTH SKINNED EXTRUDED FOAMS WITH WATER-ORGANIC BLOWING AGENT

BACKGROUND OF THE INVENTION

The manufacture of foamed thermoplastic materials by heating the pressurized thermoplastic which is mixed with a foaming agent and then extruding the thermoplastic material to a low pressure zone, is well known and widely used, particularly in making polystyrene foams. Commonly, the foamed material is extruded into a tube which is drawn over the cylindrical surface of a cooling drum and slit to form sheet stock. The sheet stock can then be thermofoamed into articles such as cups, trays and egg cartons. A variety of organic blowing agents including hydrocarbons such as propane, butane, pentane and isopentane as well as halogenated hydrocarbons such as the Freons are commonly used. These foaming agents are released to the atmosphere during the production of the foams and cause pollution. The hydrocarbon blowing agents also create a potential fire hazard. Moreover, the organic blowing agents are costly compared to atmospheric gases. Accordingly, in U.S. Pat. No. 4,424,287 there is disclosed a process in which carbon dioxide is substituted for part of the organic blowing agent thereby mitigating the problems of pollution and fire hazard, and reducing costs. In accordance with this invention, the same advantages are obtained by replacing some of the organic blowing agents with water instead of with carbon dioxide. Moreover, additional advantages are obtained in the production of foam sheets.

U.S. Pat. No. 4,455,272 discloses the formation of extruded polystyrene foams using a mixture of a physical blowing agent such as a hydrocarbon and water to produce foams with an unusual cellular structure. However, this patent does not disclose the method of forming extruded foamed sheets having a smooth, lustrous, drum side skin as produced in accordance with this invention. U.S. Pat. No. 4,455,272 is incorporated herein by reference, in entirety.

SUMMARY OF THE INVENTION

This invention relates to a method for producing a thermoplastic foam sheet having a smooth, lustrous surface on the drum side by extruding a thermoplastic material, water and a volatile organic blowing agent into a foamed tube; blowing the foamed tube over a cylindrical surface of a cooling drum; and slitting the tube. The smoothness and luster of the drum side surface is better than that obtained without the water or where carbon dioxide is used as a co-blowing agent along with the volatile organic agent.

BRIEF DESCRIPTION OF THE DRAWINGS

FIG. 2 is a schematic, side elevation view, partly in cross-section, of one form of the foam cooling and control apparatus useful in the present invention.

FIG. 3 is a plan view taken on line 3—3 of FIG. 2.

FIG. 4 is a plan view taken on line 4—4 of FIG. 2.

FIG. 5 is an enlarged cross-sectional view of an air-baffle arrangement shown in FIG. 2.

DETAILED DESCRIPTION OF THE INVENTION

This invention is broadly directed to the production of thermoplastic foams but is particularly adapted for the production of foams from styrenic resins. Styrenic resins include polystyrene and polymers of substituted styrenes particularly para-methylstyrene as well as copolymers thereof.

The volatile organic blowing agent which is used preferably a hydrocarbon or a halogenated hydrocarbon. Suitable materials include propane, the isomers of butane, the isomers of pentanes and hexanes, and halogenated hydrocarbons such as trichloroflouromethane and dichlorodifluoromethane. The quantity of volatile organic blowing agent which is used can vary depending on the product desired but generally is in the range of 0.05 to 0.1 mols per 100 grams of the thermoplastic. For isopentane 2 to about 8 weight percent is generally suitable. The amount of water used can vary considerably but amounts which will give a water to organic blowing agent ratio of 0.1:1 to 0.5:1 have been found suitable. It is preferred that the composition contain a finely divided solid as a nucleating agent. Talc is conventionally used in polymeric foams and is preferred.

The films of this invention can be prepared by the use of an apparatus such as described in U.S. Pat. No. 4,049,768 to Luthra, which is incorporated herein by reference.

Figure 1:
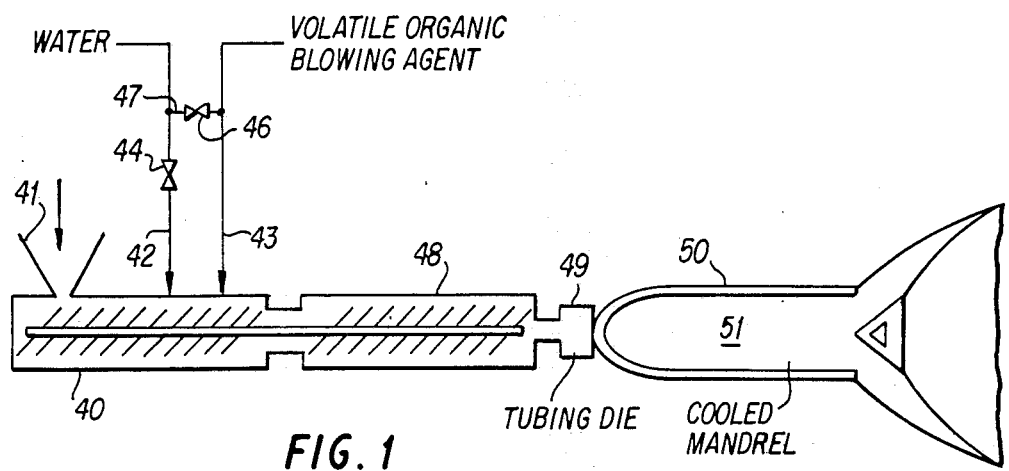
FIG. 1 shows, in schematic form, a system of producing foam according to the present invention.

In the system of FIG. 1, resin pellets comprising polystyrene and talc are fed to an extruder 40 to supply hopper 41. Other additives such as colorants, stabilizers, etc. can be added but are not essential for the invention. In extruder 40, the resin is thoroughly fused at a temperature above its melting point, generally in the range of 150° to 250° C. The blowing agent mixture is introduced in the downstream end of extruder 40 in two optional systems. For this purpose, feed injection lines 42 and 43 are provided for feeding water and physical blowing agent, respectively. Optionally, the water and volatile organic agent can be injected at a common point, and for this purpose valve 44 in line 42 and valve 46 in line 47 are provided.

From the extruder, the resin is passed to mixer 48 for thorough mixing and temperature reduction, temperatures of 75° and 135° C. generally being used. From mixer 48 the mixture passes to a tubing die 49. For the production that is suitable for use in packaging materials, a circular die is used and the tubular film 50 expanded over a cooled mandrel 51, cut with a knife 52, opened up and taken to a take-up system, not shown.

Figure 6:
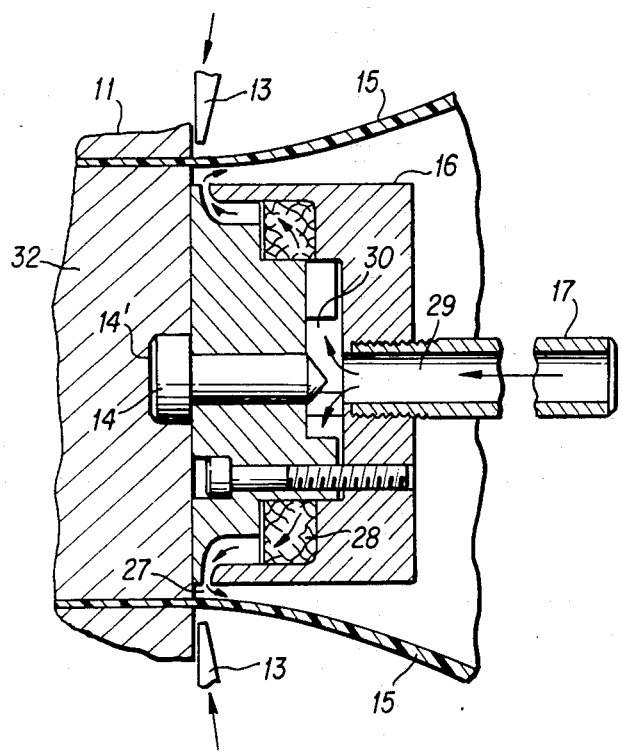
FIG. 6 is a schematic, cross-sectional view of the air nozzle means shown in FIG. 2, and an enlarged fragmentary cross-sectional portion of a tubular extrusion die.

The extrusion die is more particularly shown in FIG. 2, which schematically represents a portion of an extrusion and forming line incorporating a cooling arrangement useful in the present invention. Thermoplastic material such as polystyrene foam may be extruded through annular extrusion orifice 12 to form tubular foam member 15 which begins to foam immediately upon exit from the annular orifice 12 of die member 11. As shown in FIGS. 2 and 6, there is an external conventional air ring 13 which surrounds the extruded tube 15 as it emerges from the die orifice and immediately being cooling the extruded surface of foam 15 to retard foaming action on that surface while the internal portion of the layer foam and forms individual foam cells. Tubular foam member 15 is next down over the surface of cylindrical drum member 26 which forms, and additionally cools, the foam tube. The cooling action is achieved on the drum surface by the circulation of cooling fluids (not shown) in the internal surface of drum 26. As foam tube 15 is drawn along the surface of drum 26, it is eventually slit by slitter knives 31 positioned on opposite sides of drum 26. Subsequently, the slit, individual foam sheets are passed to further processing or, alternatively, to a wind-up operation.

As also shown in FIG. 2, and in greater detail in FIG. 6, and internal fluid cooling nozzle 16 is positioned interiorly of the foam tube as it emerges from die member 11. Nozzle 16 is positively positioned by having an externally centrally located probe 14 aligned with an inserted into matching engagement with recess 14 located centrally on the face of annular die 32. Hence, nozzle 16 will always be positively centrally positioned with respect to the die and the foam material 15 issuing from the die orifice. Radial orifice 27 which surrounds nozzle 16 supples cooling air under pressure to the internal surface of foam layer 15 immediately upon its emergence from die orifice 12 as more clearly shown in FIG. 6. The direction of the cooling air from orifice 27 is substantially perpendicular to the interior surface of tubular foam element 15 whereby all of the cooling from nozzle 16 is directed at the interior surface of the foam 15.

Supply coolants for nozzle 16 may be selected from a variety of gaseous media and particularly air is a preferred coolant. Preferably, the air may be chilled by conventional refrigeration exchange means (not shown) and is subsequently fed to supply line 17 and through supply line 17 enters nozzle 16, as shown in FIG. 6, through passage 29 and is distributed through plenum 30 into chamber 28, which contains baffling material such as copper gauze or polyurethane open cell foam and the like materials to act as a baffle for diffusing the air prior to its exit from orifice 27 of cooling nozzle 16. The orifice gap 27 of nozzle 16 may have an aperture of from about 7 mil. to about 20 mil. and preferably from about 10 mil. to about 15 mil. It is preferred that relatively high velocity air, i.e., on the order of from about 600 ft/min. to about 1,000 ft/min. to be forced through orifice 27 to effect sudden and rapid cooling of the interior surface of foam tube 15. The preferred distance intermediate the interior foam surface and orifice gap 27 is about ⅛ inches, but may vary from about 0 to 1 inches.

It will be noted that the face of forming drum 26 has a protruding lip 25 surrounding its periphery to facilitate passage of the foam tube to and over the surface of drum 26. The face 20 of drum 26, as shown in FIG. 3, is provided with a radial aperture 22. In accordance with one aspect of the device radial aperture 22 is employed to exhaust the cooling air supplied by nozzle 16 out of the interior of the space defined by the die face, the conical portion of tube 15, and the drum face 20.

For precise control of the rate of exhaust of the cooling air from drum face 20, radial aperture 22 is baffled with an adjustable baffle plate 21 mounted immediately behind drum face 20 as shown in FIG. 2. Baffle plate 21 is provided with a radial aperture 23 which when in alignment with radial aperture 22 will allow for maximum flow or exhaust of cooling air from the interior of the tube. It will be noted that baffle plate 21 is mounted on a rotatable vent control arm 19, handle 18 being affixed to vent control arm 19 to adjust movement of baffle plate 21 with respect to drum face 20.

It will be obvious that as aperture 23 of rotatable baffle plate 21 is moved out of alignment with aperture 22 is drum face 20, the amount of air which is exhausted from the interior of the tube will be decreased proportionately, baffle plate 21 gradually obstructing radial orifice 22 as radial orifice 23 is turned out of alignment therewith. The periphery of aperture 23 of rotatable baffle plate 21 is lined with a sufficient amount of rubber gasket material so as to minimize air leaks and thereby making the control of air through this baffle plate arrangement more effective.

FIG. 5 which is a vertical cross-section through drum face member 20 and baffle element 21, when they are in operative engagement, shows that they are separated by rubber gasketing material 24 to facilitate the turning movement of baffle member 21 against the downstream surface of fixed drum face 20, and present leakage of air. The commercially available rubber gasketing material of nominal thickness. e.g., ⅛ inches, and width, from about ⅜ inches to about ½ inches has been found to be adequate.

The invention is illustrated by the following non-limiting examples.

EXAMPLES 1-3

A series of extrusions with polystyrene containing 0.84 percent by weight of talc into foam sheets were made at Pilot Plant extruder with an output of 175 lb/hr using various water feed rates. The results are tabulated in Tables 1 and 2.

TABLE 1

| Example | i-Pentane Flow Rate Ml/Min | $H_2O$ Flow Rate Ml/Min |
| --- | --- | --- |
| C-1 | 107 | 0 |
| 1 | 107 | 2.69 |
| 2 | 107 | 5.59 |
| 3 | 88 | 5.59 |
| C-2 | 88 | 0 |

For i-pentane and water as blowing agents the total amount of blowing agents (B.A.) available in molar basis is listed below, using sample A as reference.

TABLE 2

| EXAMPLE | i-PENTANE | $H_2O$ | TOTAL B.A. | GAUGE (mil)* | DENSITY* (lb/ft$^3$) |
| --- | --- | --- | --- | --- | --- |
| C-1 | 1.0 | 0 | 1.00 | 67 | 5.68 |
| 1 | 1.0 | 0.162 | 1.16 | 91 | 4.50 |
| 2 | 1.0 | 0.336 | 1.34 | 102 | 4.05 |
| 3 | 0.822 | 0.336 | 1.16 | 92 | 4.39 |
| C-2 | 0.822 | 0 | 0.82 | 58 | 6.27 |

*Average value for 4–5 samples

The foam sheets produced with all the extrusion conditions appeared to have good quality, without corrugation. The comparison in Table 2 suggests that there is a direct relation between the gauge and the amount of B.A. available (in molar basis), and that water can replace i-pentane successfully within the amounts of blowing agent studied.

The samples of Examples 1-3 made with water as a co-blowing agent exhibited an unusually smooth, lustrous skin on the side adjacent to the drum.

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

We claim:

1. A method for producing a thermoplastic foam sheet having a smooth, lustrous surface by extruding a foamed tube of thermoplastic material, water and a volatile organic blowing agent; drawing the foam tube over the cylindrical surface of a cooling drum; and slitting the tube; in which said smooth, lustrous surface is on the surface drawn over said cooling drum and has a smoothness and luster which is greater than obtained absent the water.

2. The method of claim 1 in which said thermoplastic is polystyrene.

3. The method of claim 1 in which said organic blowing agent is a hydrocarbon or halogenated hydrocarbon.

4. The method of claim 1 in which said organic blowing agent is isopentane.

5. The method of claim 3 in which said thermoplastic is polystyrene.

6. The method of claim 4 in which said thermoplastic is polystyrene.

7. The process of claim 1 in which the molar ratio of water to organic blowing agent is 0.1:1 to 0.5:1.

8. The process of claim 1 in which said thermoplastic includes a nucleating agent.

9. The process of claim 8 in which the nucleating agent is talc.

* * * * *